(12) United States Patent
Swaine

(10) Patent No.: US 12,164,436 B2
(45) Date of Patent: Dec. 10, 2024

(54) APPARATUS AND METHODS FOR SETTING INDICATOR DATA TO INDICATE WHETHER A GROUP OF CONTIGUOUSLY ADDRESSED INFORMATION ENTRIES IN A SELECTED ADDRESS INFORMATION TABLE PROVIDES A BASE ADDRESS INDICATING A LOCATION WITHIN A CONTIGUOUSLY ADDRESS REGION COMPRISING MULTIPLE ADDRESS INFORMATION TABLES AT A LATER TABLE LEVEL

(71) Applicant: Arm Limited, Cambridge (GB)

(72) Inventor: Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 17 days.

(21) Appl. No.: 17/999,649

(22) PCT Filed: May 20, 2021

(86) PCT No.: PCT/GB2021/051213
§ 371 (c)(1),
(2) Date: Nov. 22, 2022

(87) PCT Pub. No.: WO2021/240133
PCT Pub. Date: Dec. 2, 2021

(65) Prior Publication Data
US 2023/0289294 A1    Sep. 14, 2023

(30) Foreign Application Priority Data

May 27, 2020 (GB) ..................... 2007936

(51) Int. Cl.
*G06F 12/00* (2006.01)
*G06F 12/1009* (2016.01)
*G06F 12/1027* (2016.01)

(52) U.S. Cl.
CPC ...... *G06F 12/1009* (2013.01); *G06F 12/1027* (2013.01)

(58) Field of Classification Search
CPC .. G06F 12/1009; G06F 12/1027; G06F 12/08; G06F 12/0223; G06F 12/0292
See application file for complete search history.

(56) References Cited

U.S. PATENT DOCUMENTS 5,966,735 A     10/1999 Noel et al.
2006/0075146 A1*  4/2006 Schoinas ............. G06F 12/1009
                                                                      710/22

(Continued)

OTHER PUBLICATIONS

Robert Bedichek, "Some Efficient Architecture Simulation Techniques", Robert Bedichek Department of Computer Science, FR-35, University of Washington, Seattle, Washington 98195, 1990.

*Primary Examiner* — Shawn X Gu
(74) *Attorney, Agent, or Firm* — NIXON & VANDERHYE P.C.

(57) ABSTRACT

Apparatus comprises address processing circuitry to detect information relating to an input memory address provided by address information tables; the address processing circuitry being configured to select an address information table at a given table level according to earlier information entry in an address information table; and the address processing circuitry being configured to select an information entry in the selected address information table according to an offset component, the offset component being defined so that contiguous instances of that portion of the input memory address indicate contiguously addressed information entries; the address processing circuitry comprising detector circuitry to detect whether indicator data is set to indicate whether a group of one or more contiguously addressed information entries in the selected address information table provide at least one base address indicating a (Continued)

location within a contiguously addressed region comprising multiple address information tables at a later table level.

14 Claims, 11 Drawing Sheets

(56) References Cited

U.S. PATENT DOCUMENTS

| | | | |
|---|---|---|---|
| 2006/0075285 A1* | 4/2006 | Madukkarumukumana | G06F 12/1009 711/E12.067 |
| 2011/0225389 A1* | 9/2011 | Grisenthwaite | G06F 12/1009 711/E12.059 |
| 2013/0219143 A1* | 8/2013 | Bennett | G06F 12/109 711/163 |
| 2016/0140048 A1* | 5/2016 | Mukherjee | G06F 12/1027 711/135 |
| 2020/0159558 A1 | 5/2020 | Bak et al. | |
| 2020/0174923 A1* | 6/2020 | Bhattiprolu | G06F 12/1081 |

* cited by examiner

APPARATUS AND METHODS FOR SETTING INDICATOR DATA TO INDICATE WHETHER A GROUP OF CONTIGUOUSLY ADDRESSED INFORMATION ENTRIES IN A SELECTED ADDRESS INFORMATION TABLE PROVIDES A BASE ADDRESS INDICATING A LOCATION WITHIN A CONTIGUOUSLY ADDRESS REGION COMPRISING MULTIPLE ADDRESS INFORMATION TABLES AT A LATER TABLE LEVEL

BACKGROUND

This disclosure relates to data processing.

Memory Management allows the building of data processing systems with multiple virtual address maps, so that each application running on an operating system can have its own virtual memory mappings. Each application will be located in a separate address space in physical memory. The MMU maps memory addresses used by an application, called virtual addresses, into physical addresses in memory using translation tables. Translation tables are for example tree-shaped hierarchical table data structures created by software in memory.

MMU hardware generally traverses the translation tables to accomplish virtual address translation. Traversing a translation table can involve performing several memory accesses to read the translation tables.

Instead of translation data, other information can be provided using similar structures, such as attribute and/or permission data.

SUMMARY

In an example arrangement there is provided apparatus comprising:
  address processing circuitry to detect information relating to an input memory address by reference to a respective chain of information entries provided by address information tables in respective ones of an ordered plurality of hierarchical table levels;
  the address processing circuitry being configured to select an address information table at a given table level according to a base address dependent upon an earlier information entry in an address information table earlier than the given table level in the ordered plurality of table levels;
  and the address processing circuitry being configured to select an information entry in the selected address information table according to an offset component dependent upon at least a portion of the input memory address applicable to the given table level, the offset component being defined so that contiguous instances of that portion of the input memory address indicate contiguously addressed information entries;
  the address processing circuitry comprising detector circuitry to detect whether indicator data is set to indicate whether a group of one or more contiguously addressed information entries in the selected address information table provide at least one base address indicating a location within a contiguously addressed region comprising multiple address information tables at a later table level.

In another example arrangement there is provided a method comprising:
  detecting information relating to an input memory address by reference to a respective chain of information entries provided by address information tables in an ordered plurality of hierarchical table levels;
  selecting, for a given address information table at a given table level, an information entry in an address information table at a table level later than the given level in the ordered plurality of hierarchical table levels by a pointer defined by a base address dependent upon an information entry in the given address information table and an offset component dependent upon at least a portion of the input memory address, the pointer being defined so that contiguous instances of that portion of the input memory address indicate contiguously addressed information entries; and
  detecting whether indicator data is set to indicate whether a set of one or more contiguous table entries in the given address information table provide a base address specifying a contiguously addressed region comprising multiple address information tables at a later table level.

In another example arrangement there is provided a method comprising:
  generating information relating to input memory addresses;
  generating address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information, the generating step comprising:
    detecting an amount of memory available to store the ordered plurality of hierarchical table levels to provide the information relating to input memory addresses;
    detecting whether, in the detected amount of memory, a set of multiple address information tables at the same table level can be stored in a contiguously addressed memory region; and
    when the set of multiple address information tables at the same table level can be stored in the contiguously addressed memory region, generating a set of one or more contiguous table entries in a higher table level to provide a base address specifying the contiguously addressed region; and
  storing the address information tables to the memory.

In another example arrangement there is provided apparatus comprising:
  processor circuitry to generate information relating to input memory addresses and to generate address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information;

the processor circuitry being configured to detect an amount of memory available to store the ordered plurality of hierarchical table levels to provide the information relating to input memory addresses and to detect whether, in the detected amount of memory, a set of multiple address information tables at the same table level can be stored in a contiguously addressed memory region; and when the set of multiple address information tables at the same table level can be stored in the contiguously addressed memory region, to generate a set of one or more contiguous table entries in a higher table level to provide a base address specifying the contiguously addressed region; and a memory to store the address information tables.

In another example arrangement there is provided a computer program for controlling a host data processing apparatus to provide an instruction execution environment comprising:

address processing circuitry to detect information relating to an input memory address by reference to a respective chain of information entries provided by address information tables in respective ones of an ordered plurality of hierarchical table levels;

the address processing circuitry being configured to select an address information table at a given table level according to a base address dependent upon an earlier information entry in an address information table earlier than the given table level in the ordered plurality of table levels;

and the address processing circuitry being configured to select an information entry in the selected address information table according to an offset component dependent upon at least a portion of the input memory address applicable to the given table level, the offset component being defined so that contiguous instances of that portion of the input memory address indicate contiguously addressed information entries;

the address processing circuitry comprising detector circuitry to detect whether indicator data is set to indicate whether a group of one or more contiguously addressed information entries in the selected address information table provide at least one base address indicating a location within a contiguously addressed region comprising multiple address information tables at a later table level.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
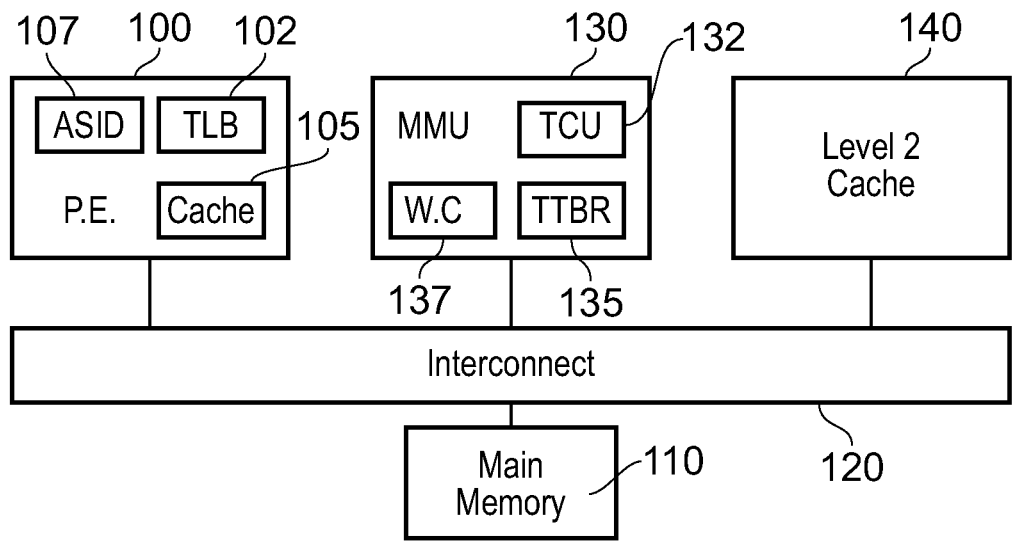
FIG. 1 schematically illustrates a data processing system.

Before discussing the embodiments with reference to the accompanying figures, the following description of embodiments is provided.

An example embodiment provides apparatus comprising:

address processing circuitry to detect information relating to an input memory address by reference to a respective chain of information entries provided by address information tables in respective ones of an ordered plurality of hierarchical table levels;

the address processing circuitry being configured to select an address information table at a given table level according to a base address dependent upon an earlier information entry in an address information table earlier than the given table level in the ordered plurality of table levels;

and the address processing circuitry being configured to select an information entry in the selected address information table according to an offset component dependent upon at least a portion of the input memory address applicable to the given table level, the offset component being defined so that contiguous instances of that portion of the input memory address indicate contiguously addressed information entries;

the address processing circuitry comprising detector circuitry to detect whether indicator data is set to indicate whether a group of one or more contiguously addressed information entries in the selected address information table provide at least one base address indicating a location within a contiguously addressed region comprising multiple address information tables at a later table level.

The disclosure provides for a potential improvement in the manner, by which tables of the sort discussed above are generated and/or stored and/or accessed, by providing the use of indicator data which can be used to indicate a mapping between a contiguous set of one or more entries in a table and a contiguous region at a later table level. This can be used to improve for example, the efficiency by which information relating to table accesses can be cached, by potentially allowing information relating to multiple entries to be covered by a smaller number (such as one) of cache entries. In some situations the arrangement can allow one or more table levels to be omitted.

In example arrangements a last information entry in the chain of information entries, provided by an address information table at a last table level in the ordered plurality of hierarchical table levels, defines the information relating to the input memory address.

The disclosure is applicable to various types of information relating to an input memory address which can be expressed in the form of an ordered hierarchy of tables. An example is the situation in which the address processing circuitry comprises address translation circuitry to perform address translations, in which the information relating to the input memory address defines at least an address translation between that input memory address in an input address space and a translated output memory address in an output address space. In the context of memory address translation, the disclosure can be applicable to a single stage translation or to any one or more stages of a multiple stage translation, so that in example arrangements the input memory address is one of a virtual memory address and an intermediate physical address; and the output memory address is one of an intermediate physical address and a physical address.

Another example is one in which the address processing circuitry comprises permission circuitry, in which the information relating to an input memory address defines at least an access permission associated with the input memory address.

In some examples, the indicator data may be configured to indicate whether the group of one or more contiguous table entries in the selected address information table provide respective base addresses indicating a group of contiguously addressed address information tables at a next table level in the ordered plurality of hierarchical table levels. This can lead to potentially more efficient accessing of tables, particularly if access information such as table base addresses is cached.

The techniques are therefore particularly applicable to arrangements having a cache memory (such as a so-called "walk cache") to store data representing information entries retrieved from the address information tables by the address processing circuitry, in which the cache memory is configured to store data representing a single base address in respect of a group of one or more contiguously addressed information entries for which the indicator data is detected to be set.

A particular improvement in table storage and/or accessing can be achieved if the use of the indicator data allows one or more table levels to be omitted, for example in an arrangement in which the indicator data is configured to indicate whether an information entry in the selected address information table provides a base address indicating a contiguously addressed region comprising multiple address information tables at a table level after the next table level in the ordered plurality of hierarchical table levels. In such examples, the address processing circuitry may be configured to select, in response to accessing an information entry in the selected table level for which the indicator data is set, an information entry in an address information table at a table level after the next table level following the given level in the ordered plurality of hierarchical table levels. In order to address tables at that later level appropriately, in example arrangements the address processing circuitry is configured to select the information entry in an address information table at a table level after the next table level following the given level according to an offset component dependent upon at least the respective portions of the input memory address associated with the given table level and the table level following the given table level.

Another example embodiment provides a method comprising:
    detecting information relating to an input memory address by reference to a respective chain of information entries provided by address information tables in an ordered plurality of hierarchical table levels;
    selecting, for a given address information table at a given table level, an information entry in an address information table at a table level later than the given level in the ordered plurality of hierarchical table levels by a pointer defined by a base address dependent upon an information entry in the given address information table and an offset component dependent upon at least a portion of the input memory address, the pointer being defined so that contiguous instances of that portion of the input memory address indicate contiguously addressed information entries; and
    detecting whether indicator data is set to indicate whether a set of one or more contiguous table entries in the given address information table provide a base address specifying a contiguously addressed region comprising multiple address information tables at a later table level.

Another example embodiment provides a method comprising:
    generating information relating to input memory addresses;
    generating address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information, the generating step comprising:
        detecting an amount of memory available to store the ordered plurality of hierarchical table levels to provide the information relating to input memory addresses;
        detecting whether, in the detected amount of memory, a set of multiple address information tables at the same table level can be stored in a contiguously addressed memory region; and
        when the set of multiple address information tables at the same table level can be stored in the contiguously addressed memory region, generating a set of one or more contiguous table entries in a higher table level to provide a base address specifying the contiguously addressed region; and
    storing the address information tables to the memory.

Another example embodiment provides apparatus comprising:
    processor circuitry to generate information relating to input memory addresses and to generate address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information;
    the processor circuitry being configured to detect an amount of memory available to store the ordered plurality of hierarchical table levels to provide the information relating to input memory addresses and to detect whether, in the detected amount of memory, a set of multiple address information tables at the same table level can be stored in a contiguously addressed memory region; and when the set of multiple address information tables at the same table level can be stored in the contiguously addressed memory region, to generate a set of one or more contiguous table entries in a higher table level to provide a base address specifying the contiguously addressed region; and a memory to store the address information tables.

Another example embodiment provides a computer program for controlling a host data processing apparatus to provide an instruction execution environment comprising:

address processing circuitry to detect information relating to an input memory address by reference to a respective chain of information entries provided by address information tables in respective ones of an ordered plurality of hierarchical table levels;

the address processing circuitry being configured to select an address information table at a given table level according to a base address dependent upon an earlier information entry in an address information table earlier than the given table level in the ordered plurality of table levels;

and the address processing circuitry being configured to select an information entry in the selected address information table according to an offset component dependent upon at least a portion of the input memory address applicable to the given table level, the offset component being defined so that contiguous instances of that portion of the input memory address indicate contiguously addressed information entries;

the address processing circuitry comprising detector circuitry to detect whether indicator data is set to indicate whether a group of one or more contiguously addressed information entries in the selected address information table provide at least one base address indicating a location within a contiguously addressed region comprising multiple address information tables at a later table level.

Data Processing Using Memory Address Translation

Referring now to the drawings, FIG. 1 schematically illustrates a data processing system. A processing element (PE) 100 having a local cache memory 105 is arranged to access data stored in a main memory 110 via an interconnect 120. A memory management unit (MMU) 130 is connected to the interconnect 120 to handle memory address translation. The MMU is associated with a translation table base address (TTBR) register 135, a translation control unit (TCU) 132 and a walk cache 137 to be discussed further below.

The PE 100 and/or the MMU make use of a translation lookaside buffer (TLB). In the present example, a TLB 102 is provided as part of the PE 100. During the operation of the system of FIG. 1, there is a routine need to access system memory. Memory addresses are expressed for the purposes of internal processing within the modules of the PE 100 as virtual addresses (VAs). In order to proceed with an actual access to system memory, a VA needs to be translated to a physical address (PA) by which the system memory is addressed at an electrical level. This translation is carried out by the TLB, though if the TLB is unable to service a particular translation it obtains information from the MMU as discussed below. The operation of a TLB will be discussed further with reference to FIGS. 2 and 3. The TLB 102 provides an example of a translation buffer to store data defining one or more address translations between the virtual address space and the physical address space.

Note that although the TLB is shown in FIG. 1 as being a part of the PE 100, the TLB could instead be implemented as part of the MMU 130, or in other embodiments the functionality of the TLB could be provided at both of the PE 100 and the MMU 130. In some examples the PE 100 could be associated with a so-called "micro" TLB local to that PE, and the MMU could be associated with a "main" TLB.

A level 2 cache 140 provides a local, and generally somewhat faster, storage area for selected contents of the main system memory. Recently or frequently accessed portions of the main system memory, or portions of the main system memory which are expected to be required in the near future such as portions adjacent to recently accessed portions, are replicated in the level 2 cache 140 so that those portions can be accessed quickly when needed. If a required portion is not currently held in the level 2 cache 50, then that portion is fetched from the main system memory when access to that portion is required. In these respects, the level 2 cache 140 operates according to established principles associated with such cache memories and so details of its operation will not be described except where they are relevant to the present discussion. It is noted that the contents of the level 2 cache memory 140 are accessed according to their physical address.

Figure 2:
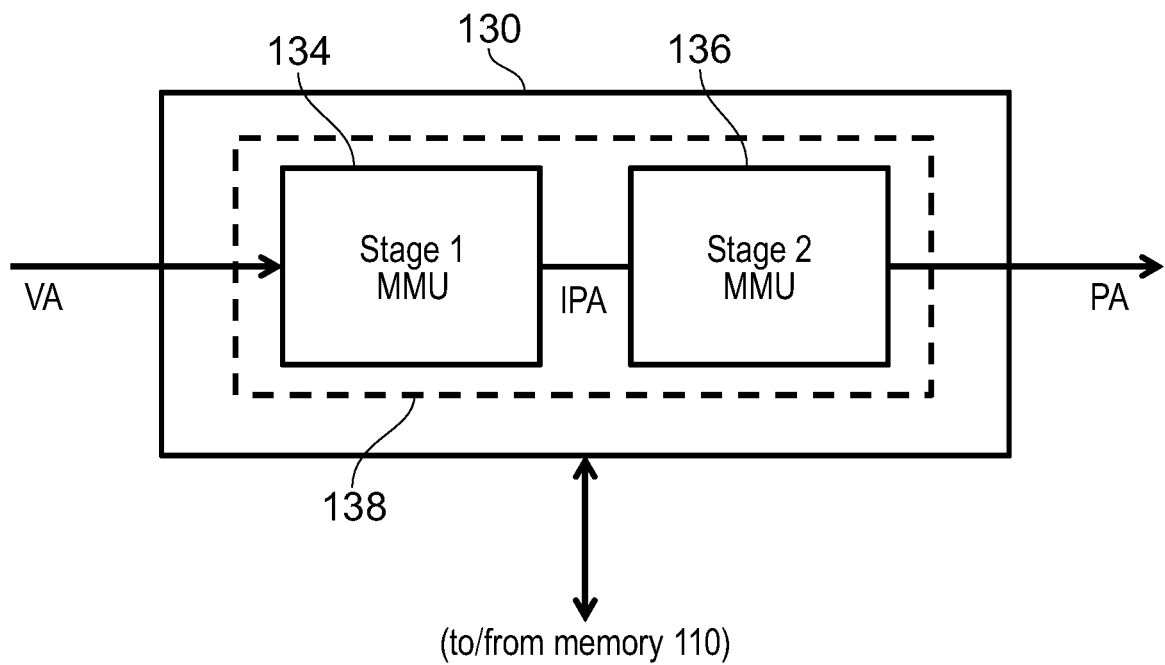
FIG. 2 schematically illustrates a two-stage MMU.
Figure 3:
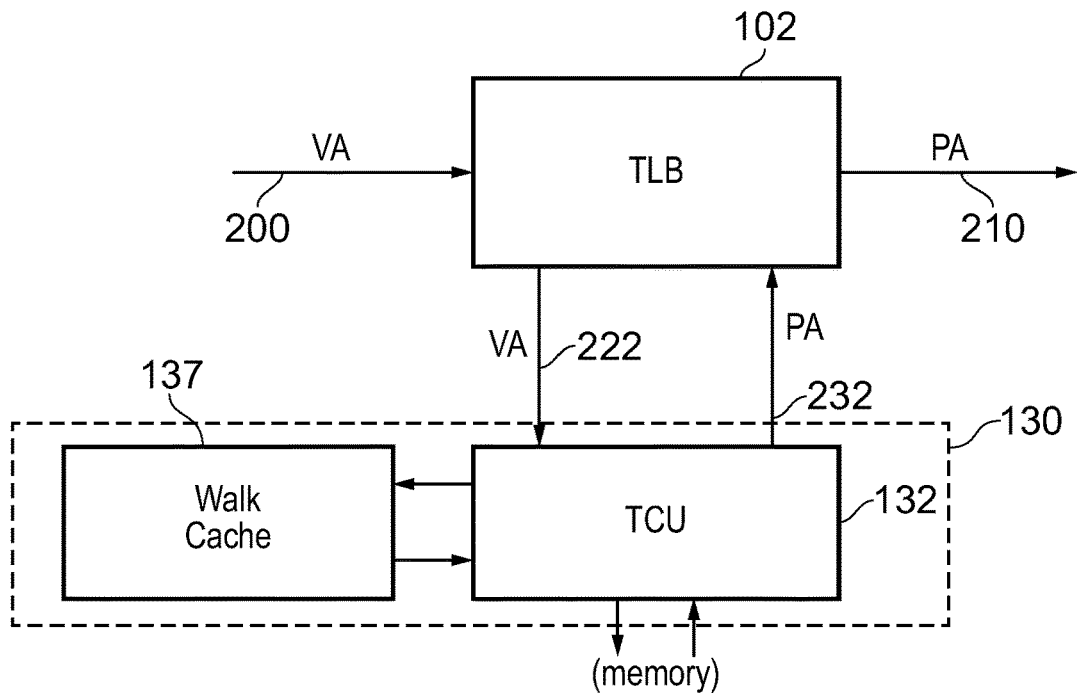
FIG. 3 schematically illustrates the use of a memory management unit (MMU) and a translation lookaside buffer (TLB)

As shown in FIG. 2, the MMU 130 may be a two-stage MMU (as an example of a multiple stage MMU), comprising a stage 1 MMU 134 and a stage 2 MMU 136. A virtual address (VA) required by an executing program or other system module such as the PE 100 is translated to an intermediate physical address (IPA) by the stage 1 MMU. Memory accesses are shown schematically for performing page table walks and the like. The IPA is translated to a physical address (PA) by the stage 2 MMU. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation.

Note that although FIG. 2 shows conceptually how a two-stage MMU operates, in practice, a single circuitry structure (represented by a broken line box 138) may perform both stages of translation, for example by implementing a state machine which can handle both.

In some examples (not shown here) a third or other stage can also use similar techniques as those to be discussed, in that a page table based approach can be used to obtain permission data, attribute data or other data in relation to a translated or other address. Therefore, in general terms, the present techniques can be considered to relate to address processing circuitry to detect information relating to an input memory address, where the "information" could be a full or partial translation or other information such as permission data, attribute data or other data, and the "input memory address" can be a PA, an IPA, a VA or other input address, and (in the case of a translation) an output memory address can be an IPA or a PA.

A significant reason why the MMU 130 is required is that it handles address translations which are not currently stored in the TLB 102. The way in which this is carried out will be discussed further below. In handling these matters, referring to FIG. 3, the MMU 130 receives requests 222 from the TLB via the interconnect 120 and returns responses 232 to the TLB, again via the interconnect 120.

As part of the operation of the PE 100 or other arrangement with which a TLB 102 is associated, the TLB 102 receives a VA 200 relating to a required memory access. This could of course be a read or a write memory access; it is immaterial to the present discussion which type of memory access is underway. The TCU 132 handles obtaining translations not in the TLB 102, for example by initiating a so-called page table walk.

Figure 4:
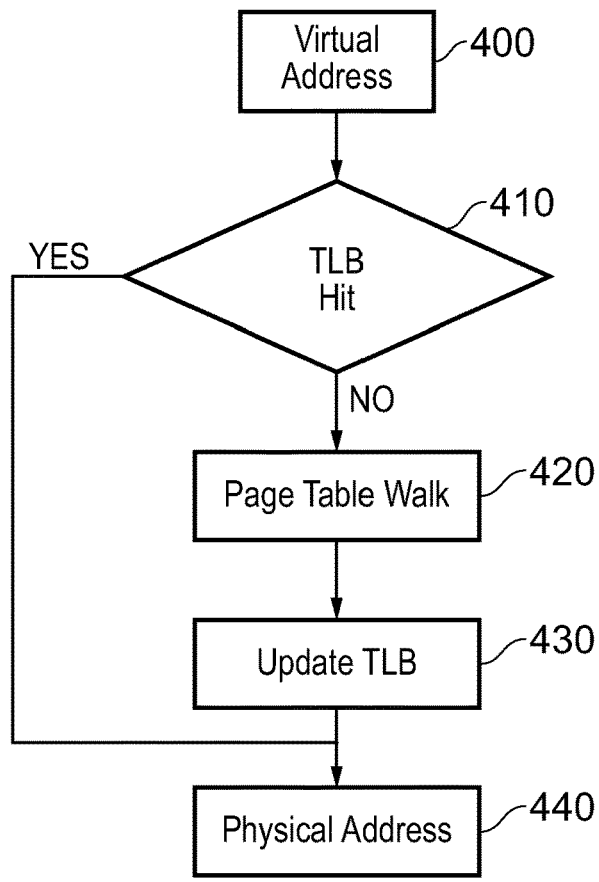
FIG. 4 is a schematic flowchart illustrating a method.

Referring also to FIG. 4 (which is a schematic flowchart illustrating operations of a TLB), supply of a VA 200 to the TLB 102 forms a request for a corresponding PA 210 (shown in FIG. 4 as a step 400).

At least in the context of an example single stage MMU, the TLB contains a cache or store of translations between VA and PA. The criteria by which the TLB stores particular VA to PA translations can be established according to known techniques for the operation of a TLB. The cached translations might include recently used translations, frequently used translations and/or translations which are expected to be required soon (such as translations relating to VAs which are close to recently-accessed VAs). Overall, the situation is that the TLB contains a cache of a subset of the set of all possible VA to PA translations, such that when a particular VA to PA translation is required, it may be found that the translation is already held in the cache at the TLB, or it may not. Note that in a two-stage MMU, there could be one or more TLBs for VA to PA translations, VA to IPA translations and IPA to PA translations.

Accordingly, at a next step 410, the TLB detects whether the required translation is indeed currently cached by the TLB (a "hit"). If the answer is yes, then control passes to a step 440 at which the PA is returned for use in the required memory access.

If the answer is no, then control passes to a step 420 at which the TLB 102 sends a request, comprising the required VA 222, to the MMU 130 (if the TLB 102 is external to the MMU 130) and in particular to the TCU 132. The TCU 132 derives the required VA to PA translation (for example by accessing data stored in memory using so-called page table walk (PTW) techniques to be discussed below) and sends at least the PA 232 corresponding to the VA 222 back to the TLB 102 where it is stored at a step 430.

Finally, at the step 440, the TLB 102 applies the translation stored at the TLB 102 to provide an output PA 210.

In the context of a multiple stage MMU, a single TLB can be provided in respect of the overall VA to PA translation, and/or individual TLBs can be provided for each MMU stage. In either of these situations, the operations with respect to the TLB may correspond to those shown in FIG. 4 in respect of the type of translation or other information cached in the TLB.

Therefore, in these embodiments, the MMU provides an example of "address processing circuitry" which comprises address translation circuitry to perform address translations, in which the information relating to the input memory address defines at least an address translation between that input memory address in an input address space and a translated output memory address in an output address space. In other examples, "address processing circuitry" may comprise permission circuitry, in which the information relating to an input memory address defines at least an access permission associated with the input memory address.

Page Table Walk

Figure 5:
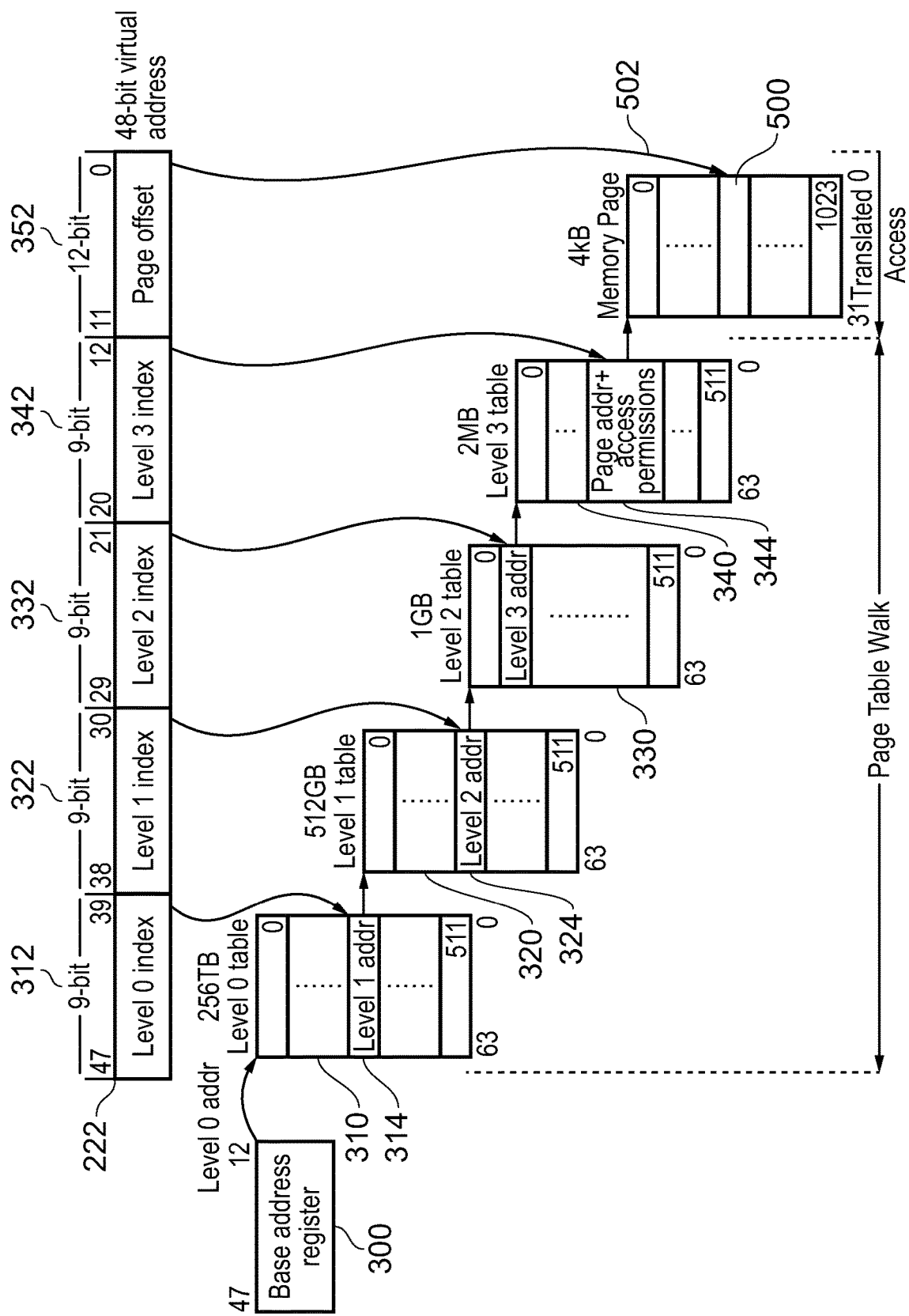
FIG. 5 schematically illustrates a so-called page table walk (PTW) process.

The PTW process involves traversing a hierarchical set of so-called page tables to arrive at a translation of a particular VA. In the case of a single stage memory translation, the output may be a PA. In the case of a multiple stage memory address translation, the process can be rather more involved. Accessing the page tables themselves requires a PA, so at each access of a next table in the hierarchy, a translation stage may itself be required in order to obtain the PA of the next required table. Having said this, FIG. 5 schematically illustrates an example of a stage 1 page table walk (PTW) process, and FIG. 6 is a schematic flowchart illustrating a PTW process.

In this example, a VA 222 which requires translation is formed as a 48-bit value. Different portions of the VA 222 are used at different levels in the PTW process. The partitioning of those portions in FIG. 5 is shown purely by way of illustrative example.

In the context of the process to be described below, the walk cache 137 can store information obtained from previously implemented instances of page table access (for example, applicable to that stage of a multiple stage MMU, which is to say it stores either IPAs, PAs or both). So, before initiating any particular page table access, the walk cache (or a portion of the walk cache or a dedicated individual walk cache associated with the page table level in question) can be consulted, and if the information which would be obtained from that page table access is already in the walk cache, this avoids the need to perform that particular access to memory.

Figure 6:
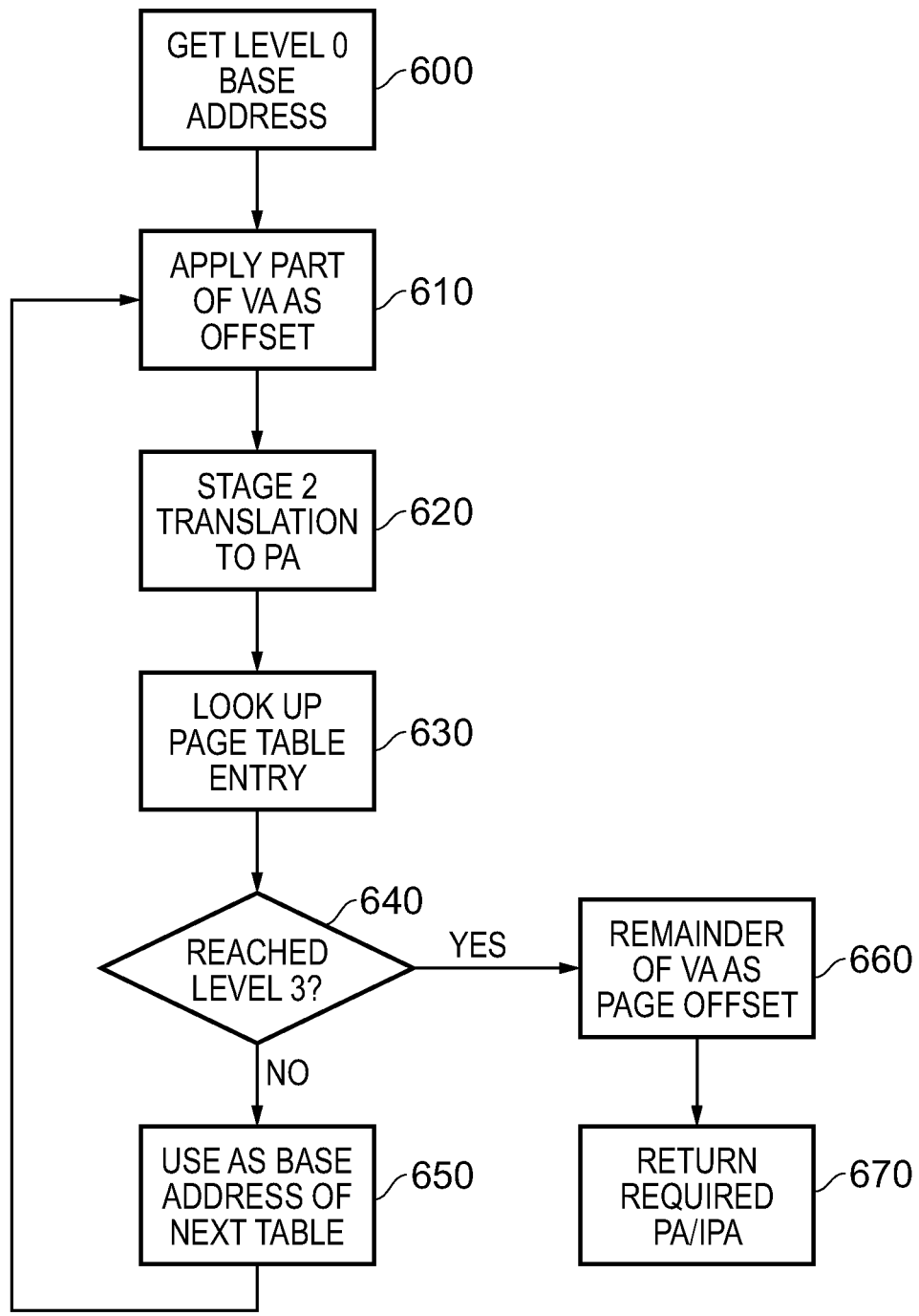
FIG. 6 is a schematic flowchart illustrating a method.

To obtain a first entry in the page table hierarchy, in a "level 0 table" 310, a base address stored in a base address register 300 (FIG. 5) corresponding to the TTBR 135 of FIG. 1 is obtained at a step 600 (FIG. 6). A first portion 312 of the VA 222, being (for example) the 9 most significant bits, is added to the base address as an offset, at a step 610 so as to provide the IPA of an entry 314 in the table 310. But in order to access the entry 314 indicated by that IPA, a PA indicating the location of the entry in physical memory is needed. Therefore, at a step 620, the IPA of the page table entry 314 is supplied to the stage 2 translation process for translation into a corresponding PA. When the corresponding PA is received, the relevant page table entry is looked up in physical memory or in the level 2 walk cache 137 (if the relevant page is cached) at a step 630.

At a step 640, a detection is made as to whether "level 3" has been reached in the page table hierarchy. If not, as in the present case, control passes to a step 650 at which the retrieved page table entry is used as a base address of a next table in the hierarchy. The page table entry 314 therefore provides a base address to the next level table in the hierarchy, a "level 1 table" 320. Control returns to the step 610.

At the second iteration of the step 610, a further part 322 of the VA 222, being for example the next 9 bits [38:30] of the VA 222, forms an offset from the base address of the table 320 in order to provide the IPA of an entry 324 in the table 320. Once again, this IPA is subjected to stage 2 translation to provide a PA which can be looked up to obtain the base address of a "level 2 table" 330 which in turn (by the same process) provides the base address of a "level 3 table" 340. Portions 332 and 342 of the VA form offsets into the levels 2 and 3 tables respectively.

When the steps 630 and 640 are carried out in respect of a page table entry defined by an IPA 344 in the table 340, the answer to the detection at the step 640 is "yes". The page table entry indicated by the IPA 344 provides a page address and access permissions relating to a physical memory page. The remaining portion 352 of the VA 222, for example the least significant 12 bits [11:0] provides a page offset 502 to a target address 500 within the memory page defined by the page table entry at the IPA 344, though in an example system which stores information as successive four byte (for example 32 bit) portions, it may be that the portion [11:2] provides the required offset to the address of the appropriate 32 bit word. Therefore, the combination (at a step 660) of the least significant portion of the VA 222 and the final page table entry (in this case, from the "level 3 table" 340) provides (at a step 670) the IPA 250 as a translation of the VA 222. Note that a PTW process, as described here in general terms, returns an IPA in respect of the PTW carried out by the stage 1 MMU, and separately returns a PA in respect of the PTW carried out by the stage 2 MMU.

The page entry indicated by the IPA 344 provides an example of a last information entry in a chain of information entries, provided by an address information table at a last table level in the ordered plurality of hierarchical table levels, which defines the information (in this example case a translation) relating to the input memory address.

In example embodiments, including some to be discussed below, the first MMU stage is configured to access a hierarchy of page tables, such that a page table higher in the hierarchy provides information for address translation by the second stage MMU to point to a page table next lower in the hierarchy, and a lowest page table in the hierarchy provides the set of two or more intermediate memory addresses including the corresponding intermediate memory address.

It will be appreciated however that more or fewer PTW levels than the number illustrated in FIGS. 5 and 6 can be employed.

Figure 7:
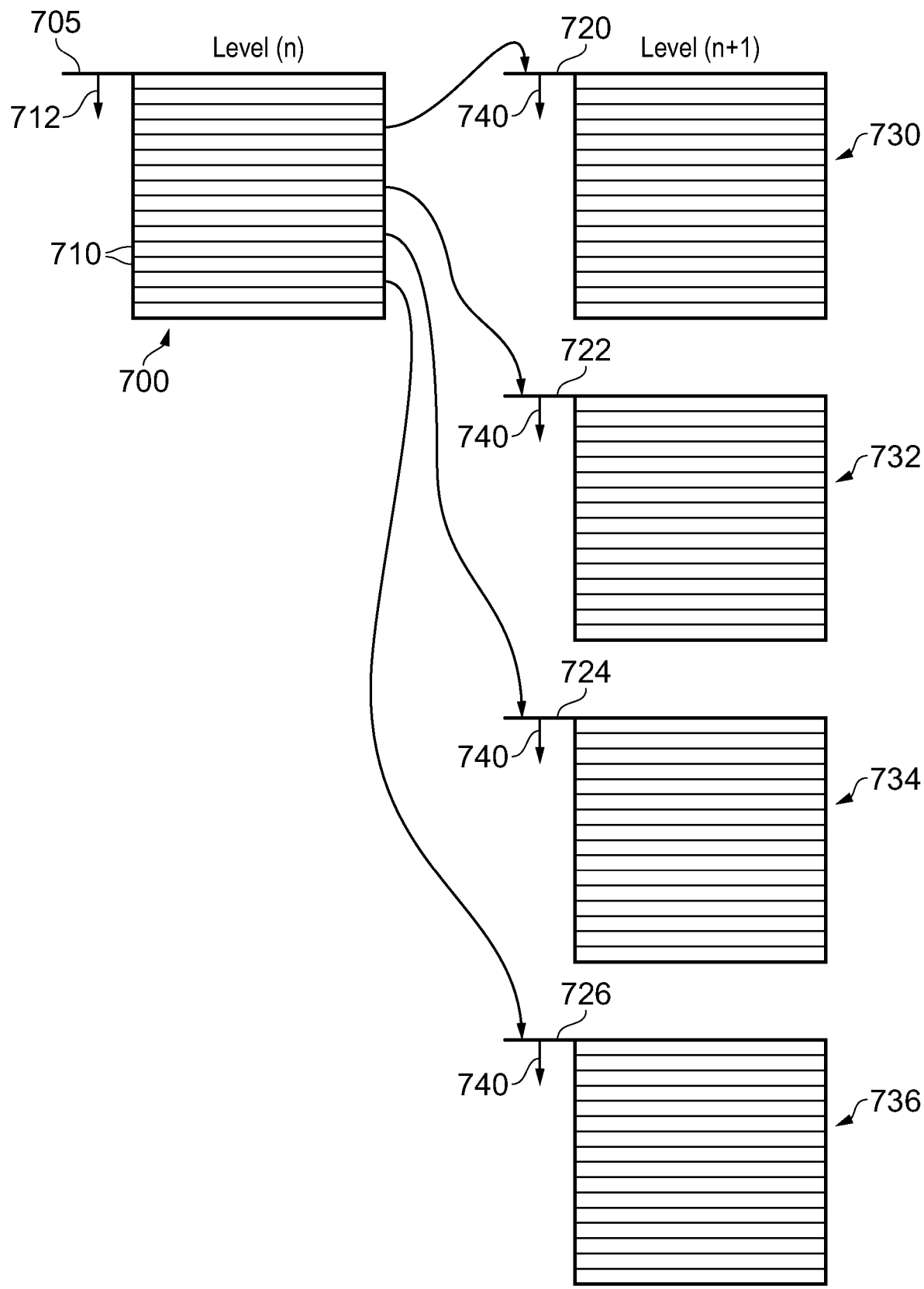
FIGS. 7 to 10 schematically illustrate sets of table levels.

FIG. 7 is a schematic illustration of a part of a chain of information entries provided by address information tables in adjacent levels of the hierarchical table levels shown in FIG. 5.

As discussed above, an address information table or page table at a given table level is selectable according to a base address dependent on an earlier information entry in the ordered plurality of page tables. So, for example, in FIG. 5 an address given by the entry 314 provides a base address of the table 320, and an address given by the entry 324 provides a base address of the table 330 and so on.

Within the selected table, an information entry or page table entry is selectable according to an offset component (relative to the base address) depending on at least a portion of the input memory address. That portion may be applicable to the given table level, for example the portion 312 is applicable to the level 0 table in FIG. 5, the portion 322 is applicable to the level 1 table in FIG. 5 and so on. The offset components are defined so that contiguous instances of that portion of the input memory address indicate contiguously addressed information entries. Here, note that the addressing of an information entry or page table entry may refer to the physical address of that page table entry (as in the example of FIG. 5) or could refer to an IPA of that page table entry requiring itself a further level of translation.

Referring to the example of FIG. 7, a table 700 at a particular table level (n) is shown. Here, n could be, for example, 0, 1 or 2 in a four level (0 . . . 3) system. Each entry 710 in the table 700 points to a respective table at the next level (n+1) and provides (potentially subject to a stage two translation) the base address 720, 722, 724, 726 of the respective table 730, 732, 734, 736 at the level n+1. In FIG. 7, only 4 such associations between entry 710 and base addresses 720 . . . 726 are shown for clarity of the diagram, but it would be the case that each of the entries 710 in the table 700 links to a respective next level table.

From the base address 705 of the level (n) table, the offset component 712 determines which entry 710 is to be consulted. The offset component is derived from at least a portion of the input memory address applicable to level (n). Similarly, the offset 740 applicable to the selection of an entry in any of the tables 730 . . . 736 is derived from at least a portion of the input memory address applicable to level (n+1).

Example-Using Indicator Data in Respect of Adjacent Table Levels

Figure 8:
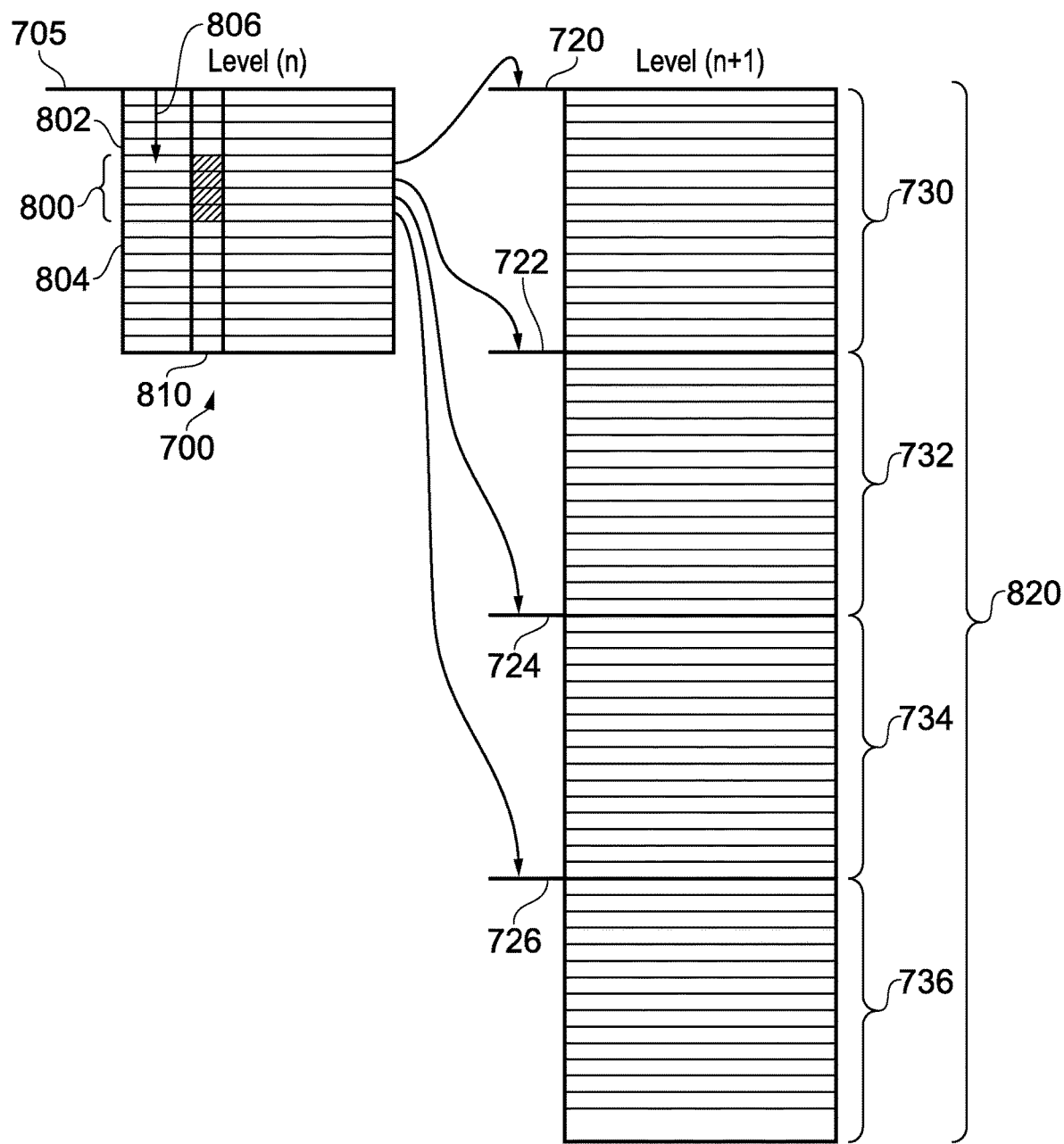

FIG. 8 schematically illustrates an example in which so-called indicator data is used in the context of adjacent table levels.

In FIG. 8, the same four tables 730 . . . 736 are shown as in FIG. 7, but a difference here is that they are pointed to by consecutive table entries 800 in the table 700 at level (n). Also, the tables at level (n+1) 730 . . . 736 are consecutively addressed so that the base address 722 follows from the last entry of the table 730 and so on.

Indicator data 810, shown schematically as a data field (such as a bit or plural bits at a predetermined bit position) within each the table entries of the table 700, is settable to indicate this situation. Here, "settable" implies that the indicator data can be set to a particular state to indicate that the condition applies, and to another state to indicate that the condition does not apply. Note also that indicator could be a single bit to indicate that a predetermined number of entries are contiguous, or could select from one of a number of different contiguity ranges, for example as a power of two, or a count of the number of contiguous entries. So, in an example, table entries including the group of four table entries 800 in the table 700 may contain at least the following information. Surrounding table entries 801, 804 are also shown, with the entries being given below in the vertical order as illustrated in FIG. 8:

| Reference on FIG. 8 | condition to be represented by indicator data | Address provided by entry |
|---|---|---|
| 802 | condition does not apply | (another table base address) |
| 800 | condition applies | base address 720 |
| 800 | condition applies | base address 722 |
| 800 | condition applies | base address 724 |
| 800 | condition applies | base address 726 |
| 804 | condition does not apply | (another table base address) |

In itself, this does not necessarily reduce the number of entries provided for the table 700. But a possible benefit is as follows.

In the absence of a detection of the indicator data, each of the entries in the table 700 would, when first accessed, occupy a respective entry in the walk cache (or the walk cache or walk cache portion applicable to level (n)). The TCU 132 can be responsible for writing data to the walk cache 137 and for controlling reading of the walk cache 137 when a table is to be accessed. For example, a walk cache entry applicable to one of the table entries 800 could indicate

| Offset portion for table (n) | Base address for level (n + 1) |
|---|---|
| offset 806 | address 720 |

When a PTW is required for that particular offset portion, a look-up in the walk cache indicates the required base address of the next level table.

However, in response to the detection of the indicator data, the group of entries 800 can be represented by a single entry in the walk cache, for example as follows:

| Indicator data | Offset portion for table (n) | Base address for level (n + 1) |
| --- | --- | --- |
| (Indicates that base address applies to four entries 800) | offset 806 | address 720 |

This provides an example in which a cache memory (in this example, the walk cache) is arranged to store data representing information entries retrieved from the address information tables by the address processing circuitry; in which the cache memory is configured to store data representing a single base address in respect of a group of one or more contiguously addressed information entries for which the indicator data is detected to be set.

Therefore, when a PTW walk is required for any of the entries 800, the single walk cache entry indicates that for the range of offset components accessing any one of the entries 800, the corresponding range of table addresses at level (n+1) is applicable. Therefore, just a single walk cache entry is needed for the group of contiguous entries 800 in the table at level (n).

By using the walk cache more efficiently the likelihood of a hit can be improved for a walk cache of a particular size. Improving the likelihood of a cache hit implies that a greater proportion of PTW operations can be completed from the walk cache rather than from more costly memory accesses, and so overall system efficiency and/or throughput and/or power consumption may be improved.

Therefore, in this context, this provides an example in which the indicator data can be set to indicate whether a group 800 of one or more contiguously addressed information entries in a particular table 700 provide at least one base address indicating a location within a contiguously addressed region 820 comprising multiple address information tables at a later table level (in this example, level (n+1)).

Example-Indicator Data Referring to Later Table Level

Figure 9:
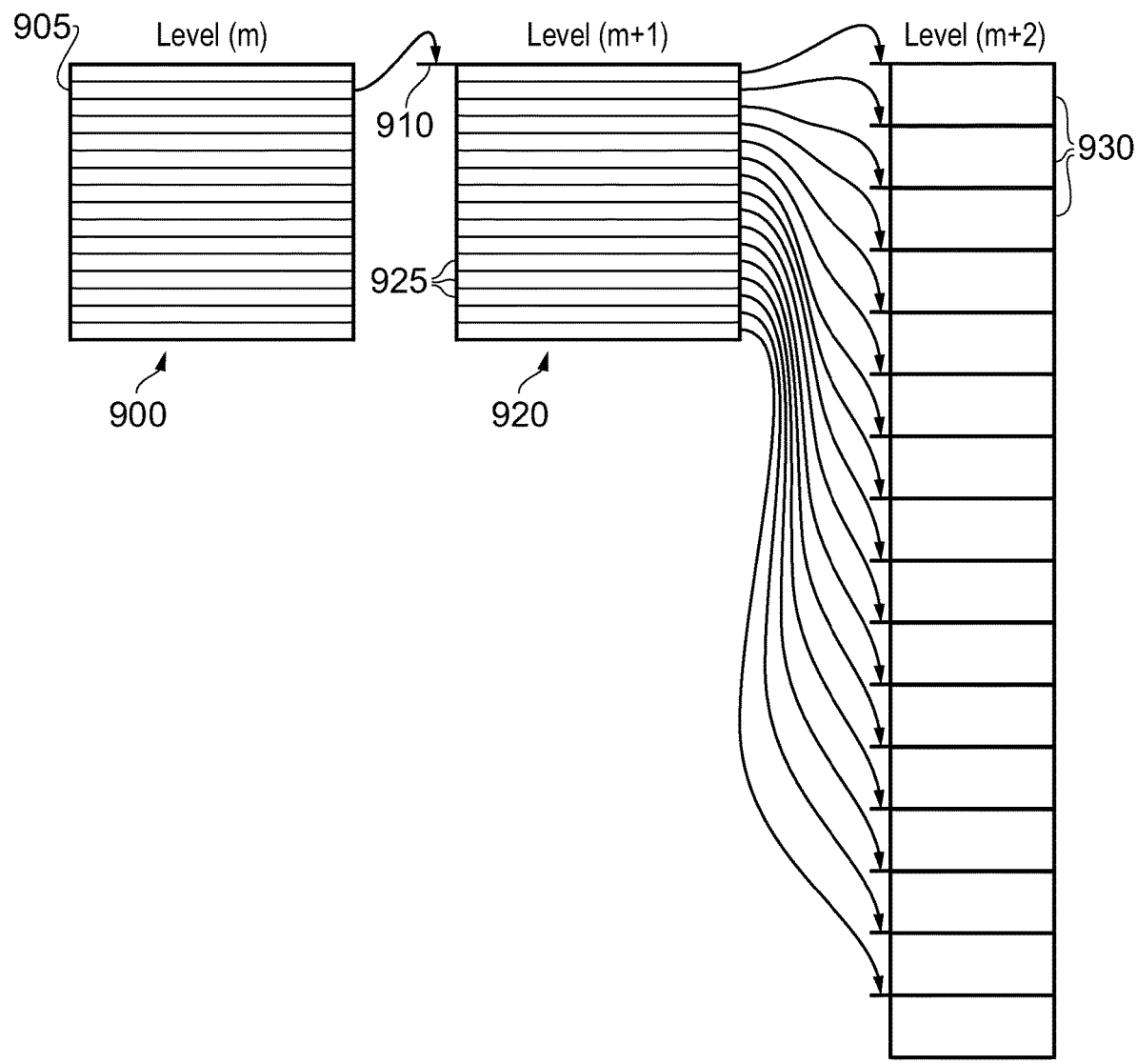

Referring now to FIG. 9, an example table 900 at a level (m) contains an example entry 905 which provides the base address 910 of a next level (m+1) table 920. Here, m could be, for example, 0 or 1 in a four level (0 . . . 3) system.

Each entry 925 in the table 920 points to a respective table 930 at a further next level (m+2). The arrangement is such that the contiguous entries 925 point to respective contiguously addressed instances of the tables 930, and that each entry 925 points to a respective table 930 in an address space region encompassing the set of tables 930.

Variations of this arrangement will be described with respect to FIG. 10, in which the indicator data is configured to indicate whether an information entry in the selected address information table provides a base address indicating a contiguously addressed region comprising multiple address information tables at a table level after the next table level in the ordered plurality of hierarchical table levels.

In particular, the present techniques can provide a rationalisation of this table structure, in that in the table 900 at the level (m), a single entry 1000 can provide a pointer 1010 to the base address 1020 of the entire region 1030 at level (m+2) containing all of the contiguously addressed tables 930.

An offset 1040 from the base address 1020 is derived as follows:

Offset=[address portion applicable to level (*m*)] concatenated with [address portion applicable to level (*m*+1)]

Figure 11:
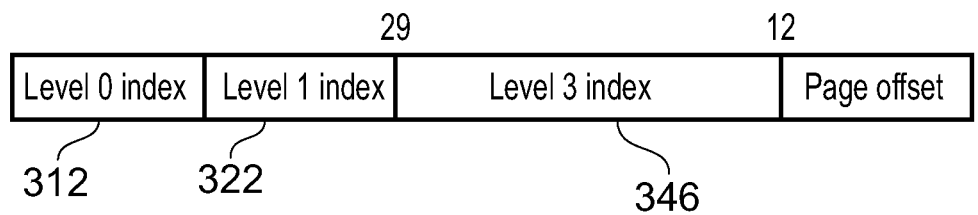
FIG. 11 schematically illustrates portions of an input address.

A specific example will be provided and described with respect to FIG. 11 below.

Example content of the entry 1000, including settable indicator data 1040, are as follows:

| Indicator data | Offset portion for table (n) | Base address for level (n + 1) |
| --- | --- | --- |
| (indicates "skip one level") | offset 1005 | address 1020 |

Here, the indicator data is configured to indicate whether the group of one or more contiguous table entries in the selected address information table (at the level (n)) provide respective base addresses indicating a group of contiguously addressed address information tables at a next table level (n+1) in the ordered plurality of hierarchical table levels.

This provides another example in which a cache memory (in this example, the walk cache) is arranged to store data representing information entries retrieved from the address information tables by the address processing circuitry; in which the cache memory is configured to store data representing a single base address in respect of a group of one or more contiguously addressed information entries for which the indicator data is detected to be set.

Therefore, when a PTW walk is required for the entry 1000, the single walk cache entry indicates that the next level (m+1) table is omitted altogether, and therefore that just a single walk cache entry is needed for in respect of the entry 1000 in order to provide the base address of all of the tables 1030 at level (m+2). In other words, the address processing circuitry is configured to select, in response to accessing an information entry in the selected table level for which the indicator data is set, an information entry in an address information table at a table level after the next table level following the given level in the ordered plurality of hierarchical table levels.

By using the walk cache more efficiently the likelihood of a hit can be improved for a walk cache of a particular size. Improving the likelihood of a cache hit implies that a greater proportion of PTW operations can be completed from the walk cache rather than from more costly memory accesses, and so overall system efficiency and/or throughput and/or power consumption may be improved.

This arrangement therefore provides an example in which the indicator data 1040 is set to indicate whether a group of one or more contiguously addressed information entries (in this example a single entry 1000) in the table 900 provides at least one base address 1020 indicating a location within a contiguously addressed region 1030 comprising multiple address information tables at a later (m+2) table level.

Note also that that the two techniques can also be combined, with for example the indicator data identifying a set of contiguous entries that also skip one or more table levels.

Figure 10:
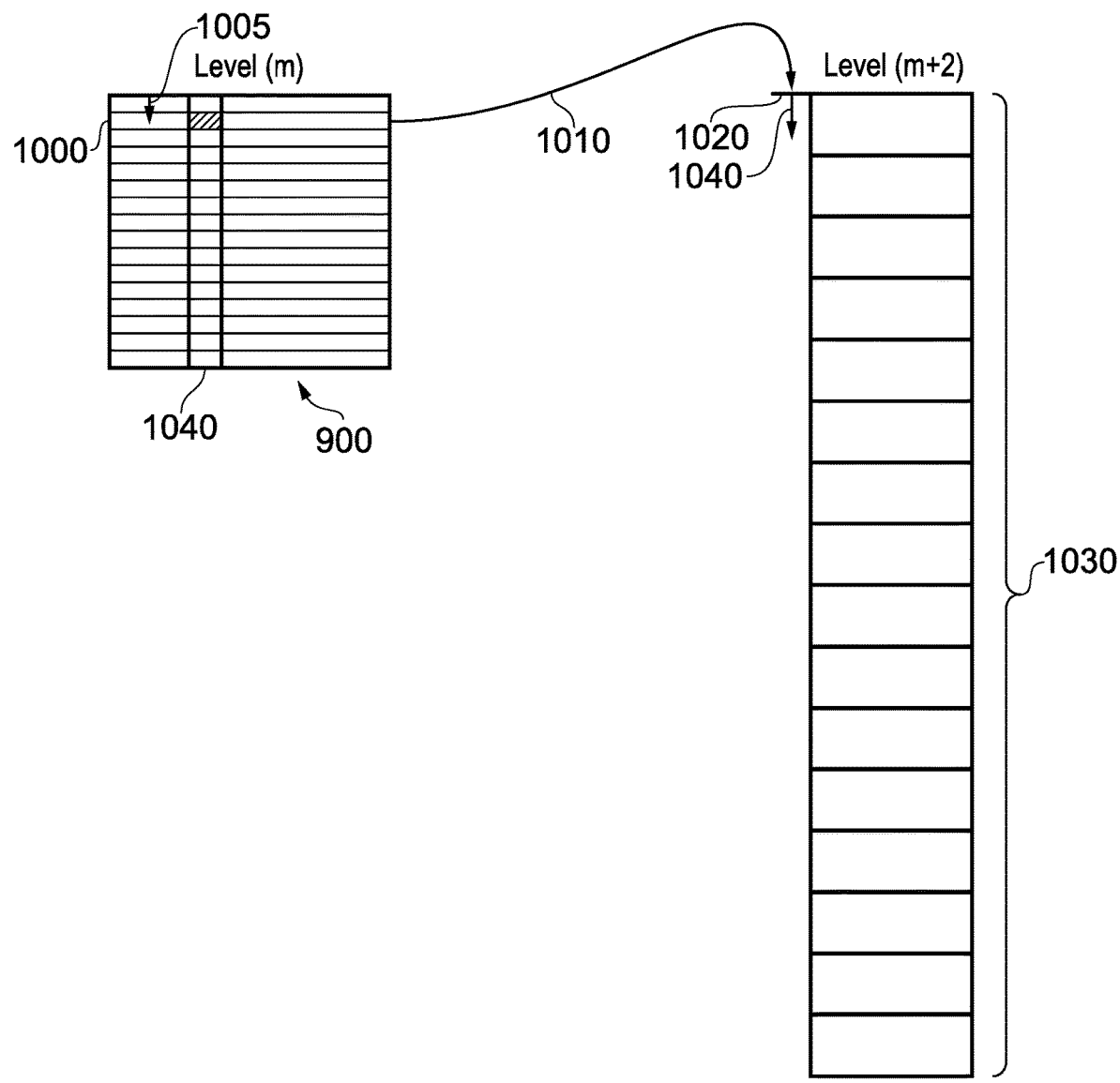

As a worked example of the offset addressing discussed above, FIG. 11 provides a representation similar to that shown by the representation 222 in FIG. 5 in which a first portion 312 of the input address forms an index into the level 0 table, a second portion 322 provides an index into the level 1 table, which in this example has an entry similar to that shown as the entry 1000 in the level (m) table of FIG. 10. So the entry 1000 is pointed to by the offset provided by the level one index 322. The indicator data 1040 set for the entry 1000 indicates that level 2 is omitted such that the address provided by the entry 1000 provides the pointer 1010 to the base address 1020 of the level 3 table (level m+2).

In these examples, the address processing circuitry is configured to select the information entry in an address information table at a table level (such as m+2 or indeed later) after the next table level (m+1) following the given level (m) according to an offset component dependent upon at least the respective portions of the input memory address associated with the given table level and the table level following the given table level.

Therefore in place of the separate portions 322, 342 of FIG. 5, a portion 346 (namely bits [29:12]) is used as an offset 1040 within the region 1030 defined by the pointer 1010, this being the concatenation of the portions 332, 342 associated with levels 2 and 3 in FIG. 5.

It will be appreciated that this arrangement can be used to skip or omit more than one level, so that (in an example four level (0 . . . 3) system) a table entry at level 0 could be accompanied by indicator data to show that it indicates the address of (say) a level 3 table. In such a case the relevant offset would be formed by the TCU as:

> Offset=[address portion applicable to level (0)] concatenated with [address portion applicable to level (1)] concatenated with [address portion applicable to level (2)]

(or VA bits [47:21] in the representation of FIG. 5)

Figure 12:
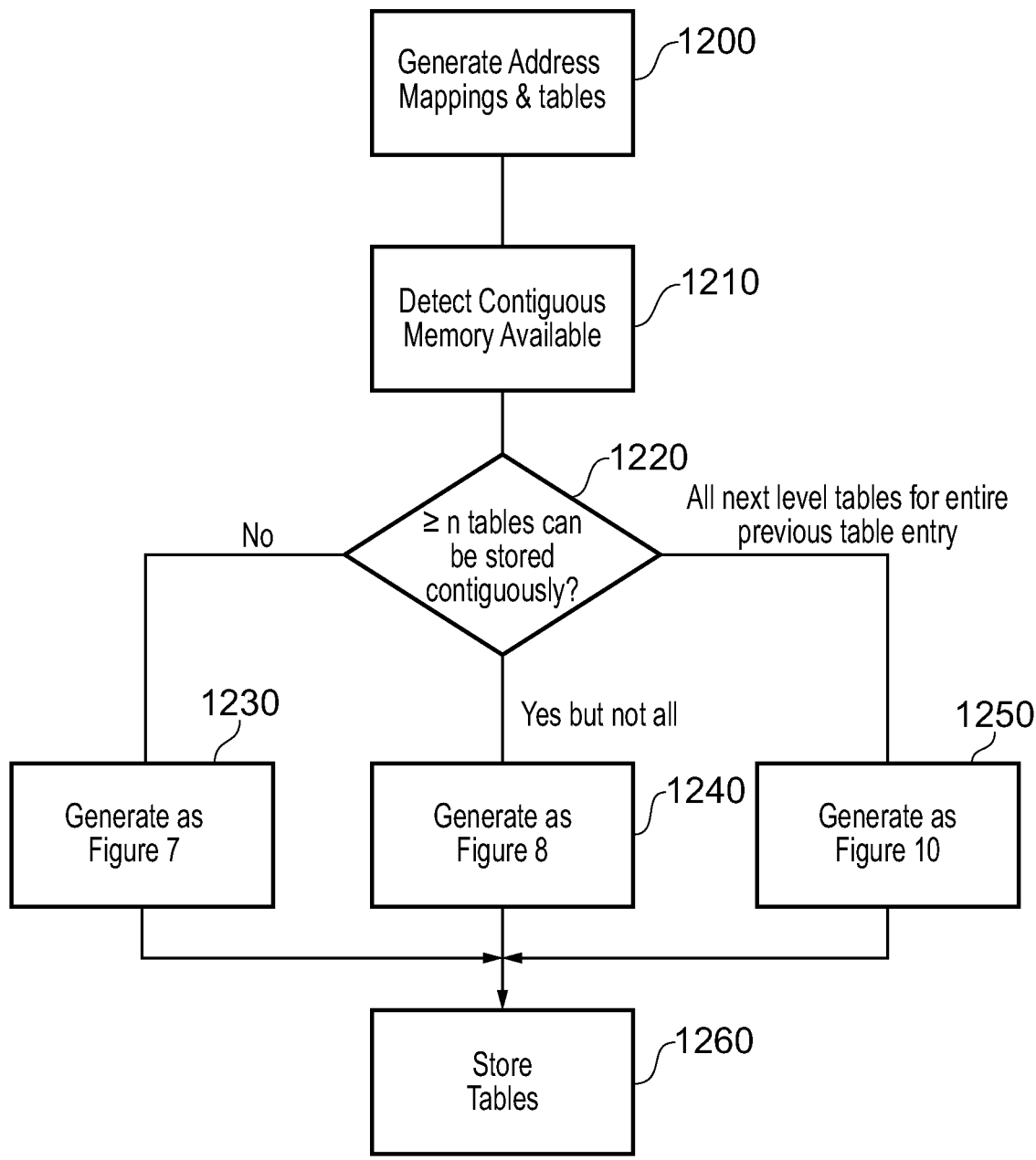
FIGS. 12 and 13 are schematic flowcharts illustrating respective methods.

FIG. 12 is a schematic flowchart illustrating an example method applicable to the generation and storage of page table data with optional use of the indicator data as discussed above. Referring to FIG. 12, a step 1200 involves generating information relating to input memory addresses. In this example, the information relates to address mappings but any other data which can be represented as a hierarchy of page tables is applicable instead or in addition. The step 1200 also includes generating a table representation, for example involving generating address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information.

The generating process can include a step 1220 involving detecting an amount of memory available to store the ordered plurality of hierarchical table levels to provide the information relating to input memory addresses and detecting whether, in the detected amount of memory, a set of multiple address information tables at the same table level can be stored in a contiguously addressed memory region.

The outcome of the step 1220 may be "no", in which case control passes to a step 1230 and page tables are generated in the format of FIG. 7.

If however the answer at the step 1220 is "yes" then one or both of steps 1240 and 1250 can be applied, for example to different respective groups of tables and/or levels within the overall structure. Each of these steps relates to the use of indicator data: the step 1240 using the techniques of FIG. 8 and the step 1250 using the techniques of FIG. 10. They have in common the features of when the set of multiple address information tables at the same table level can be stored in the contiguously addressed memory region, generating a set of one or more contiguous table entries in a higher table level to provide a base address specifying the contiguously addressed region.

Finally, at a step 1260, the address information tables are stored to the memory.

The process of FIG. 12 can be performed at, for example, boot time by the PE 100, for example. In this regard the PE 100 in conjunction with the memory 110 provides an example of processor circuitry to generate information relating to input memory addresses and to generate address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information;

the processor circuitry being configured to detect an amount of memory available to store the ordered plurality of hierarchical table levels to provide the information relating to input memory addresses and to detect whether, in the detected amount of memory, a set of multiple address information tables at the same table level can be stored in a contiguously addressed memory region; and when the set of multiple address information tables at the same table level can be stored in the contiguously addressed memory region, to generate a set of one or more contiguous table entries in a higher table level to provide a base address specifying the contiguously addressed region; and a memory to store the address information tables.

Figure 13:
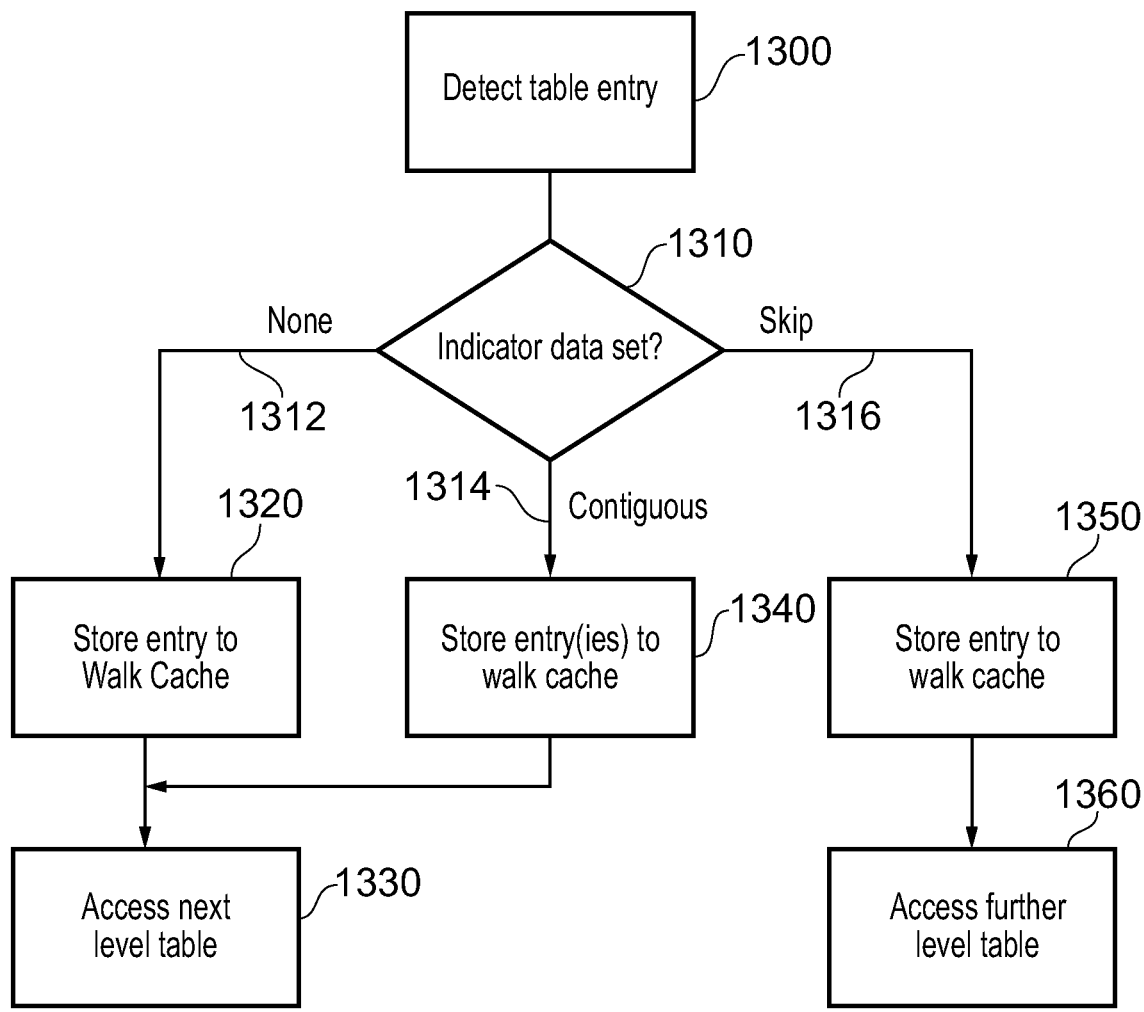

FIG. 13 is a schematic flowchart illustrating applications, including a potential combination, of the techniques described above. This forms part of a method of detecting information relating to an input memory address by reference to a respective chain of information entries provided by address information tables in an ordered plurality of hierarchical table levels.

It will be understood that the indicator data of FIG. 8 may be used with or without indicator data or FIG. 10, so that each arrangement is useable in its own right without the other arrangement being used. In the example of FIG. 13, both types of indicator data are provided, for example as different indicator values of a common indicator data field or the like.

In FIG. 13, a particular table entry is detected at a step 1300. This may involve selecting, for a given address information table at a given table level, an information entry in an address information table at a table level later than the given level in the ordered plurality of hierarchical table levels by a pointer defined by a base address dependent upon an information entry in the given address information table and an offset component dependent upon at least a portion of the input memory address, the pointer being defined so that contiguous instances of that portion of the input memory address indicate contiguously addressed information entries.

At a step 1310 a detection is made as to whether indicator data is set. The outcomes here are that the indicator data is unset (a path 1312) that the indicator data is set to indicate a group of contiguous entries (an outcome 1314) or that the indicator data is set to indicate the skipping or omission of one or more levels (an outcome 1316). This represents an example of detecting whether indicator data is set to indicate whether a set of one or more contiguous table entries in the given address information table provide a base address specifying a contiguously addressed region comprising multiple address information tables at a later table level.

In the case of the outcome 1312, an entry of a known type is stored to the walk cache at a step 1320 and the next table level is accessed at a step 1330.

In terms of the outcome 1314, one or more entries of the type discussed with reference to the description of FIG. 8 above are stored to the walk cache at a step 1340 and control passes to the step 1330.

The outcome 1316 leads to the step 1350 at which an entry is stored to the walk cache indicating the current table entry and the state of the indicator data and at a step 1360 a further table level (beyond the next table level) is accessed using the techniques described above with reference to FIG. 10.

Figure 14:
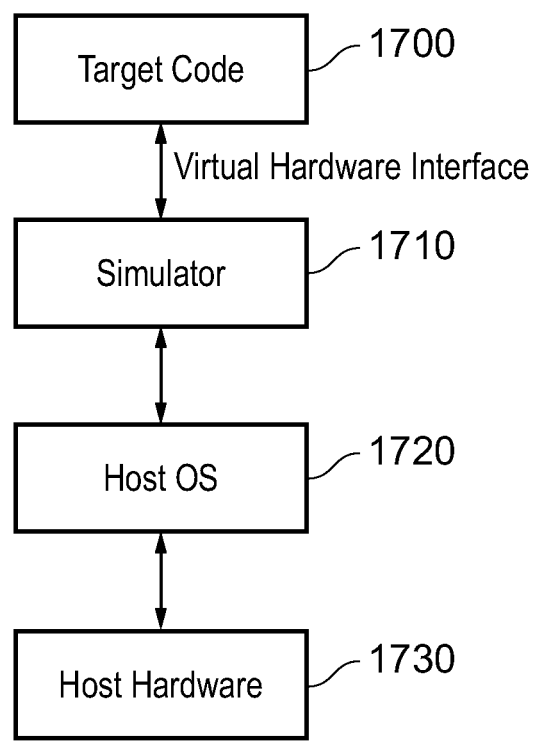
FIG. 14 schematically illustrates an emulator implementation.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1730), some simulated embodiments may make use of the host hardware, where suitable.

The simulator program 1710 may be stored on a computer-readable storage medium (which may be a non-transitory medium), and provides a program interface (instruction execution environment) to the target code 1700 (which may include applications, operating systems and a hypervisor) which is the same as the interface of the hardware architecture being modelled by the simulator program 1710. Thus, the program instructions of target code 1700, including the features described above, may be executed from within the instruction execution environment using the simulator program 1710, so that a host computer 1730 which does not actually have the hardware features of the apparatus discussed above can emulate these features.

The arrangement of FIG. 14 therefore provides an example of a computer program for controlling a host data processing apparatus to provide an instruction execution environment comprising:

address processing circuitry to detect information relating to an input memory address by reference to a respective chain of information entries provided by address information tables in respective ones of an ordered plurality of hierarchical table levels;

the address processing circuitry being configured to select an address information table at a given table level according to a base address dependent upon an earlier information entry in an address information table earlier than the given table level in the ordered plurality of table levels;

and the address processing circuitry being configured to select an information entry in the selected address information table according to an offset component dependent upon at least a portion of the input memory address applicable to the given table level, the offset component being defined so that contiguous instances of that portion of the input memory address indicate contiguously addressed information entries;

the address processing circuitry comprising detector circuitry to detect whether indicator data is set to indicate whether a group of one or more contiguously addressed information entries in the selected address information table provide at least one base address indicating a location within a contiguously addressed region comprising multiple address information tables at a later table level.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. An apparatus comprising:
   address processing circuitry to detect information relating to an input memory address by reference to a respective chain of information entries provided by address information tables in respective ones of an ordered plurality of hierarchical table levels;
   the address processing circuitry being configured to select an address information table at a given table level according to a base address dependent upon an earlier information entry in an address information table earlier than the given table level in the ordered plurality of table levels; and
   the address processing circuitry being configured to select an information entry in the selected address information table according to an offset component dependent upon at least a portion of the input memory address applicable to the given table level, the offset component being defined so that contiguous instances of that portion of the input memory address indicate contiguously addressed information entries;
   the address processing circuitry comprising detector circuitry to detect whether indicator data is set to indicate whether a group of one or more contiguously addressed information entries in the selected address information table provide at least one base address indicating a location within a contiguously addressed region comprising multiple address information tables at a later table level, wherein the address processing circuitry includes hardware circuitry.

2. The apparatus of claim 1, in which a last information entry in the chain of information entries, provided by an address information table at a last table level in the ordered plurality of hierarchical table levels, defines the information relating to the input memory address.

3. The apparatus of claim 1, in which the address processing circuitry comprises address translation circuitry to perform address translations, in which the information relating to the input memory address defines at least an address translation between that input memory address in an input address space and a translated output memory address in an output address space.

4. The apparatus of claim 3, in which:
   the input memory address is one of a virtual memory address and an intermediate physical address; and
   the output memory address is one of an intermediate physical address and a physical address.

5. The apparatus of claim 1, in which the address processing circuitry comprises permission circuitry, in which the information relating to an input memory address defines at least an access permission associated with the input memory address.

6. The apparatus of claim 1, in which the indicator data is configured to indicate whether the group of one or more contiguous table entries in the selected address information table provide respective base addresses indicating a group of contiguously addressed address information tables at a next table level in the ordered plurality of hierarchical table levels.

7. The apparatus of claim 6, comprising:
   a cache memory to store data representing information entries retrieved from the address information tables by the address processing circuitry;
   in which the cache memory is configured to store data representing a single base address in respect of a group of one or more contiguously addressed information entries for which the indicator data is detected to be set.

8. The apparatus of claim 1, in which the indicator data is configured to indicate whether an information entry in the selected address information table provides a base address indicating a contiguously addressed region comprising multiple address information tables at a table level after a next table level in the ordered plurality of hierarchical table levels.

9. The apparatus of claim 8, in which the address processing circuitry is configured to select, in response to accessing an information entry in the selected table level for which the indicator data is set, an information entry in an address information table at a table level after the next table level following the given level in the ordered plurality of hierarchical table levels.

10. The apparatus of claim 9, in which the address processing circuitry is configured to select the information entry in an address information table at a table level after the next table level following the given level according to an offset component dependent upon at least respective portions of the input memory address associated with the given table level and the table level following the given table level.

11. A method comprising:
    detecting information relating to an input memory address by reference to a respective chain of information entries provided by address information tables in an ordered plurality of hierarchical table levels;
    selecting, for a given address information table at a given table level, an information entry in an address information table at a table level later than the given level in the ordered plurality of hierarchical table levels by a pointer defined by a base address dependent upon an information entry in the given address information table and an offset component dependent upon at least a portion of the input memory address, the pointer being defined so that contiguous instances of that portion of the input memory address indicate contiguously addressed information entries; and
    detecting whether indicator data is set to indicate whether a set of one or more contiguous table entries in the given address information table provide a base address specifying a contiguously addressed region comprising multiple address information tables at a later table level.

12. A method comprising:
    generating information relating to input memory addresses;
    generating address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information, the generating address information tables comprising:

detecting an amount of memory available to store the ordered plurality of hierarchical table levels to provide the information relating to input memory addresses;

detecting whether, in the detected amount of memory, a set of multiple address information tables at a same table level can be stored in a contiguously addressed memory region; and when the set of multiple address information tables at the same table level can be stored in the contiguously addressed memory region, generating a set of one or more contiguous table entries in a higher table level to provide a base address specifying the contiguously addressed region; and storing the address information tables to the memory.

13. An apparatus comprising:

processor circuitry to generate information relating to input memory addresses and to generate address information tables in an ordered plurality of hierarchical table levels to provide the information relating to input memory addresses in which, for a given address information table at a given table level, an address information table at a given table level being selectable by a base address dependent upon an earlier information entry in an address information table earlier than the given table level in the ordered plurality of table levels and an information entry in a selected address information table being selectable according to an offset component dependent upon at least a portion of the input memory address applicable to the given table level, the offset component being defined so that contiguous instances of that portion of the input memory address indicate contiguously addressed information;

the processor circuitry being configured to detect an amount of memory available to store the ordered plurality of hierarchical table levels to provide the information relating to input memory addresses and to detect whether, in the detected amount of memory, a set of multiple address information tables at a same table level can be stored in a contiguously addressed memory region; and when the set of multiple address information tables at the same table level can be stored in the contiguously addressed memory region, to generate a set of one or more contiguous table entries in a higher table level to provide a base address specifying the contiguously addressed region; and a memory to store the address information tables, wherein the processor circuitry includes hardware circuitry.

14. A non-transitory computer readable medium comprising a computer program for controlling a host data processing apparatus to provide an instruction execution environment comprising:

address processing circuitry to detect information relating to an input memory address by reference to a respective chain of information entries provided by address information tables in respective ones of an ordered plurality of hierarchical table levels;

the address processing circuitry being configured to select an address information table at a given table level according to a base address dependent upon an earlier information entry in an address information table earlier than the given table level in the ordered plurality of table levels; and the address processing circuitry being configured to select an information entry in the selected address information table according to an offset component dependent upon at least a portion of the input memory address applicable to the given table level, the offset component being defined so that contiguous instances of that portion of the input memory address indicate contiguously addressed information entries;

the address processing circuitry comprising detector circuitry to detect whether indicator data is set to indicate whether a group of one or more contiguously addressed information entries in the selected address information table provide at least one base address indicating a location within a contiguously addressed region comprising multiple address information tables at a later table level.

* * * * *